Patented July 26, 1938

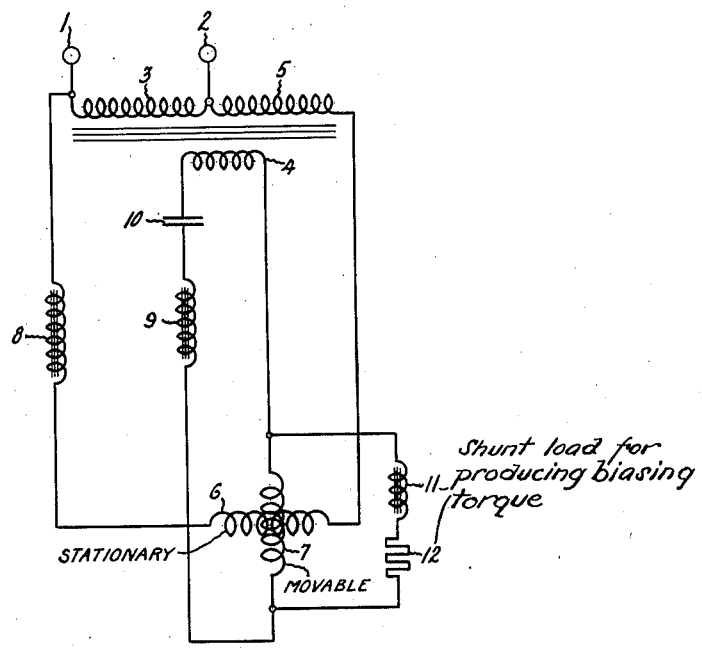
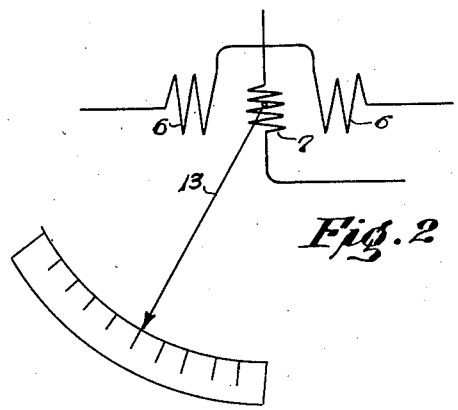

2,125,151

UNITED STATES PATENT OFFICE 2,125,151

ELECTRODYNAMICAL MEASURING INSTRUMENT

Hans Boekels, Berlin-Wannsee, Germany, assignor to General Electric Company, a corporation of New York Application February 26, 1937, Serial No. 128,021
In Germany March 5, 1936

8 Claims. (Cl. 172—245)

My invention relates to electrodynamical measuring instruments and concerns particularly dynamometer-type frequency meters.

An object of my invention is to provide frequency meters of great simplicity and ruggedness and in which the same parts may be used as in producing ordinary wattmeters, voltmeters, and ammeters.

It is an object of my invention to produce a frequency meter requiring only one stationary coil and one movable coil.

It is still another object of my invention to provide a frequency meter in which no networks are necessary to obtain proper phase relationship of currents.

A further object of my invention is to provide a frequency meter which is unaffected by variations in temperature.

Other and further objects and advantages will become apparent as the description proceeds.

In carrying out my invention in its preferred form, I provide a pair of relatively movable coils, such as the stationary and rotatable coils of dynamometer-type wattmeters and galvanometers, and I provide means for energizing both coils with a current of the frequency to be measured. One of the coils is connected in series with a condenser and a reactor having such constants as to tune the circuit substantially to the normal frequency of the circuit to be measured or alternatively such constants as to slightly detune the circuit at the normal frequency. The same coil is also shunted by a load circuit for producing biasing current to eliminate the need for biasing springs.

The invention may be understood more readily from the following detailed description when considered in connection with the accompanying drawing and those features of the invention which are believed to be novel and patentable will be pointed out in the claims appended hereto. In the drawing, Fig. 1 is a schematic diagram of one embodiment of my invention showing the electrical circuits thereof, and Fig. 2 is a detailed diagram of the relatively movable coil instrument of Fig. 1.

Referring now more in detail to the drawing, I have represented the apparatus as being arranged to measure the frequency of an alternating-current source connected to a pair of terminals 1 and 2. A transformer is provided having a primary winding 3 connected to the terminals 1 and 2 and having secondary windings 4 and 5. One or both of the secondary windings may, if desired, have turns in common with the primary winding so as to form an autotransformer. In the arrangement shown, the winding 5 includes the turns of the winding 3. A pair of relatively movable coils 6 and 7 is provided, one of which, for example, the coil 6, may be a stationary coil and the other coil, for example, the coil 7, may be rotatably mounted in the field of the stationary coil 6 and may carry suitable elements, such as a pointer 13, a recording pen, a contact arm, or other well-known devices for producing an indicating, a recording, or a relaying type of frequency-responsive instrument. One of the coils, for example, the stationary coil 6 is connected to one of the transformer windings, for example, the winding 5, and may, if desired, be connected thereto in series with an inductance 8. The other of the two relatively movable coils, in this case, coil 7, is connected to the remaining transformer winding 4, and suitable reactance elements, such as the inductance 9 and the condenser 10, are connected in series for the purpose of tuning the circuit of the coil 7. The constants may be such as substantially to tune the circuit at the frequency which is to be considered the normal frequency of the source connected to the terminals 1 and 2. However, as will be explained hereinafter, the circuit may be slightly detuned at the normal frequency.

For providing a biasing torque to determine the position of the rotatable coil 7, the coil 7 may be shunted, thereby obviating the need for biasing springs. The shunt for the coil 7 may consist of a load formed by an inductance 11 connected in series with a resistor 12. Preferably, the arrangement is such that the voltage induced in movable coil 7 by the stationary coil 6 is great enough to cause sufficient current to flow through the shunt 11, 12 for producing the biasing action. At the same time, the voltage drop in the coil 7 due to the current supplied by the transformer winding 4 should preferably be small enough to prevent such current from flowing through the shunt path and to avoid disturbance of the measurement result or the torque. In other words the relative admittance of the shunt 11, 12 in comparison with the coil 7 should be great enough to produce sufficient current for bringing about the biasing action and the relative impedance of the shunt should be great enough to avoid disturbance of the measurement result or the torque.

The manner of operation of the apparatus is as follows:

The current and voltage of the coil 6 are substantially in quadrature owing to the inductive nature of the circuit, and, since the circuit of coil 7 is tuned, the current therein will be substantially in phase with the voltage at normal frequency. Accordingly, currents in the coils 6 and 7 will be out of phase and there will be no tendency for production of torque when these coils are at right angles to each other. However, should the movable coil 7 depart from the right-angle position, there would be a certain mutual inductance resulting in the induction of voltage in the coil 7, causing current to flow through the shunt 11, 12. In accordance with well-known principles of electromagnetic induction, the direction of current would be such as to oppose rotation and the coil 7 would be returned to the position of minimum mutual inductance, namely, at right angles. In case the frequency should change so that the coil 7 is no longer tuned, the current therein would no longer be in phase with the voltage and the reaction between the currents in the coils 6 and 7 supplied by the transformer would tend to cause rotation of the coil 7 in one direction or the other depending upon the connections. As previously explained, however, this rotation would be opposed by the action of the short-circuit currents in the shunt 11, 12, and a position of equilibrium between the opposing forces would be found which would be indicative of the frequency to be measured. The current induced in the movable coil cannot affect the accuracy of measurement if there is sufficient current absorption in the tuned circuit as compared with the movable coil itself, which may be accomplished by suitable selection of the resistance of the tuned circuit.

In the foregoing discussion, the effect of the shunt 11, 12 in dephasing the current in the circuit of the movable coil has been disregarded. It will be apparent, however, that the shunt circuit 11, 12 will have the effect of causing the current in the coil 7 to be slightly out of phase with the applied voltage when the circuit is tuned. This would have the effect of changing the position of tthe center point of the scale. This effect, however, may be overcome, if desired, by slightly detuning the resonant circuit of the coil 7 or by causing the phase displacement between voltage and current of the circuit of the coil 6 to be less than 90°. With sufficient detuning of the resonant circuit, the phase displacement between current and voltage in the coil 6 need not exceed seventy degrees. Since such phase displacement can readily be obtained with an iron core inductance, it will be evident that the inductance 8 may be such an iron core inductance of relatively inexpensive type and there is no necessity for networks to obtain exact quadrature relationships.

In frequency meters, there are tendencies for errors to arise with variations in temperature owing to change in inductance of the iron core reactance. This effect, however, may be overcome by making the coil 8 of substantially greater reactance than the coil 6 and constructing it in such a manner that the phase angle or the relationship between resistance and inductance remains substantially constant regardless of temperature or, if desired, the coil 8 may be so constructed that the ratio between its resistance and inductance varies in a manner opposite to the variation in the ratio in the coil 6. Particular arrangements for obtaining negative temperature variation in the inductance of the coil 8, however, do not form a part of my invention and are, therefore, not described in detail or illustrated.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A frequency meter comprising in combination, a transformer energized by a source of alternating current, the frequency of which is to be determined, and having a pair of output windings, a pair of relatively movable coils, an inductance connected in series with one of said coils to one of said transformer output windings, tuning reactances connected in series with the other of said coils to the other of said transformer output windings, and an inductive loading circuit connected across said latter coil, said loading circuit having sufficient admittance to draw adequate induced current for biasing the coils to a position of minimum mutual inductance and sufficient impedance to have substantially no effect on the indicated measurement and torque of the movable coil.

2. A frequency meter comprising in combination, a pair of relatively movable coils, an inductance connected in series with one of said coils for forming one circuit, a second inductance and a capacitance connected in series with the other of said coils and of such magnitude as to form with said second coil a second circuit tuned to a given frequency, means for energizing said two circuits with alternating current of the frequency to be measured, and an inductive load connected in parallel with the second of said coils said inductive load having sufficient admittance to draw adequate induced current for biasing the coils to a position of minimum mutual inductance and sufficient impedance to have substantially no effect on the indicated measurement and torque of the movable coil.

3. A frequency meter comprising in combination, a pair of relatively movable coils, reactances tuned to a given frequency connected in series with one of said coils to form a circuit, means for energizing said circuit and the second of said coils with alternating current of the frequency to be measured, and a loading element connected in parallel with the first of said coils said loading element having sufficient admittance to draw adequate induced current for biasing the coils to a position of minimum mutual inductance and sufficient impedance to have substantially no effect on the indicated measurement and torque of the movable coil.

4. A frequency meter comprising in combination, a pair of relatively movable coils, an inductance connected in series with one of said coils to form one circuit, reactances tuned to a given frequency connected in series with the second of said coils to form a second circuit, means for energizing said two circuits with alternating current of the frequency to be measured, and a loading element connected in parallel with the second of said coils, said inductance being of greater magnitude than the inductance of said first coil and having means responsive to temperature for varying the mechanical dimensions thereof sufficiently to compensate for temperature variations in inductance to maintain a substantially constant ratio between the resistance and the inductance of the coil.

5. A frequency meter comprising in combination, a pair of relatively movable coils, an inductance connected in series with one of said coils to form one circuit, reactances tuned to a given frequency connected in series with the second of said coils to form a second circuit, means for energizing said two circuits with alternating current of the frequency to be measured, and a loading element connected in parallel with the second of said coils, said inductance including temperature responsive means for varying the inductance in an opposite direction from the variations in inductance inherently produced by temperature variations in the total inductance of the first coil and said inductance.

6. A frequency meter comprising in combination, a pair of relatively movable coils, reactances tuned to a given frequency connected in series with one of said coils to form a circuit, means for energizing said circuit and the second of said coils with alternating current of a frequency to be measured, means for producing phase displacement of less than ninety degrees between the currents in said coils, and a loading element connected in parallel with the first of said coils having such electrical constants as to dephase the current in the first of said coils by an amount substantially equal to the difference between 90 degrees and the phase displacement between the currents in the said coils.

7. An instrument responsive to frequency of an alternating-current circuit with which it is to be used, said instrument comprising in combination, a pair of relatively movable coils, reactances slightly detuned at the normal frequency of the alternating-current circuit and connected in series with one of said coils to form a circuit, means for energizing said circuit and the second of said coils with alternating current of the frequency to be measured, and a loading element connected in parallel with the first of said coils, said loading element having such electrical constants as to dephase the current in said circuit an amount corresponding to the phase shift in said circuit corresponding to the detuning thereof.

8. An instrument responsive to frequency of an alternating-current circuit with which it is to be used, said instrument comprising in combination, a pair of relatively movable coils, an inductance having a phase angle between seventy and ninety degrees connected in series with one of said coils for forming one circuit, reactances slightly detuned at the normal frequency of the alternating-current circuit and connected in series with the second of said coils to form a second circuit, means for energizing said circuits with alternating current of the frequency to be measured, and a loading element connected in parallel with the second of said coils.

HANS BOEKELS.